United States Patent [19]

Ikeda et al.

[11] 4,232,782
[45] Nov. 11, 1980

[54] CONTINUOUS CONVEYANCE SYSTEM

[75] Inventors: Satoshi Ikeda, Tokyo; Kouhei Shibata, Kitamoto, both of Japan

[73] Assignee: Shinko Kiko Co., Ltd., Tokyo, Japan

[21] Appl. No.: 957,579

[22] Filed: Nov. 3, 1978

[51] Int. Cl.³ .................. B65G 17/42; B65G 17/48
[52] U.S. Cl. ................................. 198/706; 198/708; 198/712
[58] Field of Search .............. 198/703, 706, 708, 712, 198/713, 714, 715, 799, 483, 549

[56] References Cited

U.S. PATENT DOCUMENTS

| 751,138 | 2/1904 | Avery | 198/714 |
|---|---|---|---|
| 2,053,147 | 9/1936 | Henderson | 198/703 |
| 3,795,305 | 3/1974 | Sandvik | 198/708 X |

FOREIGN PATENT DOCUMENTS 465746 9/1928 Fed. Rep. of Germany ............ 198/713

Primary Examiner—Jeffrey V. Nase
Attorney, Agent, or Firm—Cushman, Darby & Cushman

[57] ABSTRACT

A continuous conveyance system comprising a series of ship-shaped conveyance containers whereby bulk load is conveyed, two pairs of endless chains adapted to support and carry said conveyance containers at both front and rear portions thereof, said pairs of endless chains consisting of a pair of inner chains adapted to carry the front portion of each said container and a pair of outer chains adapted to carry the rear portion of said container, chain wheels around which said endless chains are passed, said chain wheels consisting of the inner chain wheels around which said inner endless chains are passed and the outer chain wheels around which said outer endless chains are passed, said both inner and outer chain wheels being secured to a common shaft at the rotatory section where the bulk load is received, the rotatory section where bulk load is dropped and the rotatory section where the direction of movement of the conveyance container is merely changed by 90°, said both inner and outer chain wheels being arranged horizontally while suitably spaced-apart from each other at the rotatory section where the horizontal movement of each said conveyance container is turned to the vertical movement while maintaining the horizontal posture of the container, and a bulk load discharge promoting device provided at the rotatory section where the bulk load is dropped. Each of said ship-shaped conveyance containers is made from a flexible plate with excellent releasability so as to avoid hold-over of the bulk in the container and to allow effective cooperation with the load discharge promoting device. In order to accomplish efficient discharge of bulk load, it is desirable to provide means for giving vibrations to the container body in said discharge promoting device.

10 Claims, 11 Drawing Figures

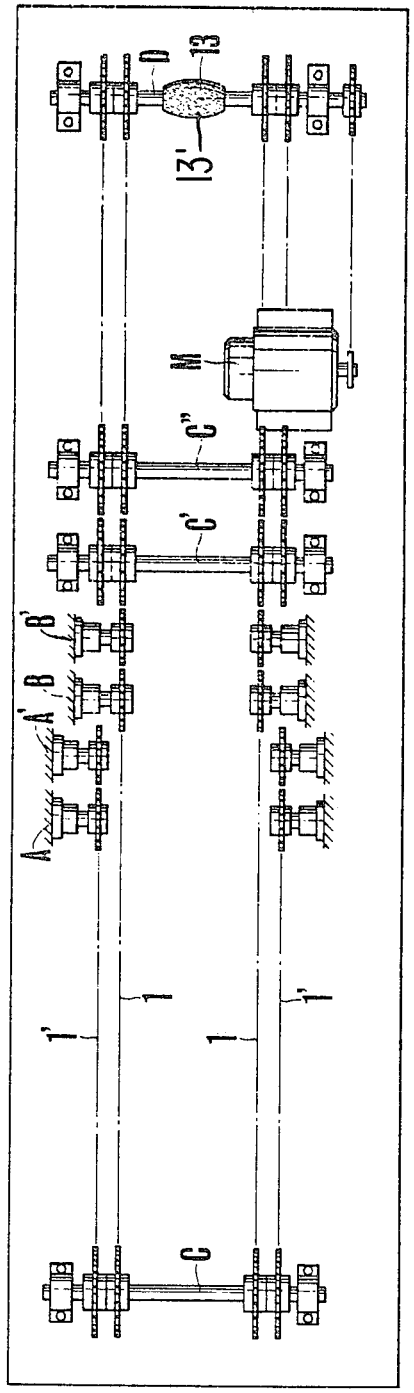
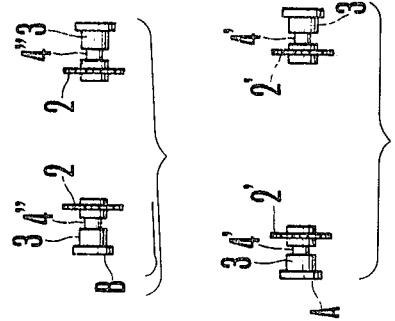
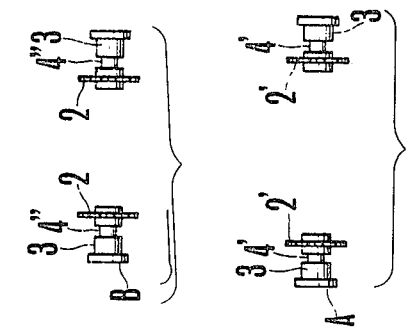
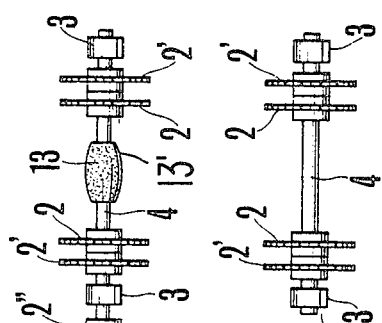

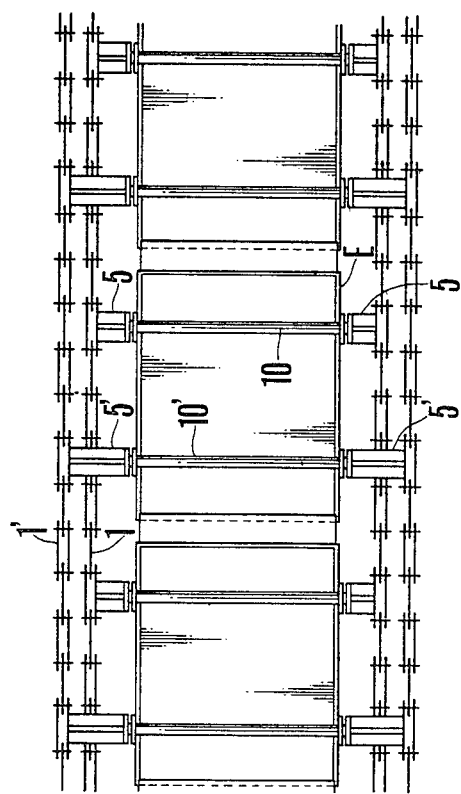
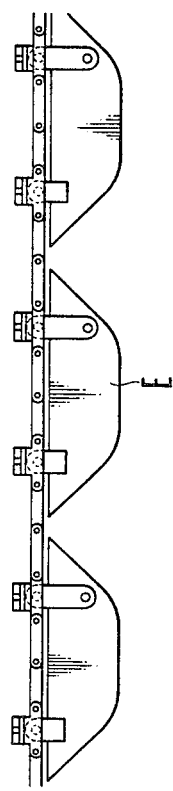
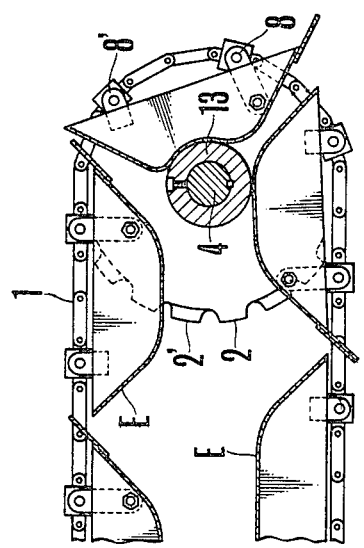

CONTINUOUS CONVEYANCE SYSTEM

BACKGROUND OF THE INVENTION

This invention relates to a conveyance system whereby a large volume of bulk load supplied continuously from a belt conveyor or other means can be conveyed continuously to a transfer section at any elevation.

As means for conveying loose bulk to an elevated position, there are known typically a bucket conveyor system comprising a series of buckets adapted to an endless chain or chains passed round a pair of upper and lower chain wheels and a belt conveyor system disposed with a gentle inclination. However, according to the conventional bucket conveyor system, the loose bulk accumulated at a low place is immediately raised up by the buckets to an elevated position, so that it is impossible with this system to continuously receive and convey to an elevated location the bulk supplied continuously from a belt conveyor or such. On the other hand, in case that the loose bulk is to be conveyed to an elevated position with the aid of the belt conveyor system, nobody can apply higher inclination than that as previously specified for installing any belt conveyor and this makes the whole conveyance system excessively elongated in the longitudinal direction. It, therefore, is pointed out with the hitherto known belt conveyor system that the same occupies a large area for installation thereof. In view of these facts the present invention is intended to eliminate the drawbacks and disadvantages inherent to the hitherto known conveyance system for loose bulk materials.

OBJECTS OF THE INVENTION

The primary object of this invention is to provide a conveyance system which is capable of continuously conveying the continuously supplied loose bulk vertically or straight up and down to any elevated or low location and which requires merely a limited space for its installation.

Another object of this invention is to provide a conveyance system capable of continuously conveying the loose bulk from a bulk receiving section to a transfer section which may be at any distance from said bulk receiving section.

Still another object of this invention is to provide a conveyance system whereby the loose bulk can be conveyed to any elevated or low location at any distance by suitably combining both horizontal and vertical transport lines.

Yet another object of this invention is to provide a conveyance system in which the conveyance containers can be moved while maintaining their horizontal posture through the course of transport from the bulk receiving section to the transfer section.

A further object of this invention is to provide a conveyance system which suffers little drop-out of the bulk from the conveyance containers in the course of conveyance.

Still another object of this invention is to provide a conveyance system according to which the loose bulk in any conveyance container won't be left over in the container but is entirely dropped out of the container.

An additional object of this invention is to provide a conveyance system which allows smooth, quiet and secure conveyance of loose bulk.

SUMMARY OF THE INVENTION

In order to accomplish the above-said objects, there is provided according to this invention a continuous conveyance system comprising in combination a series of ship-shaped conveyance containers for conveying loose bulk, with the body portion of each said container being formed from flexible plates with excellent releasability, two pairs of endless chains adapted to support and carry the front and rear portions of each said container, said pairs of endless chains consisting of a pair inner endless chains adapted to carry the front portion of each said conveyance container and a pair of outer endless chains adapted to carry the rear portion of each said container, chain wheels around which said pairs of endless chains are passed, said chain wheels consisting of inner chain wheels around which said inner endless chains are passed and outer chain wheels around which said outer endless chains are passed, said both inner and outer chain wheels being secured to a common shaft at the rotatory section where the bulk is received, the rotatory section where the bulk is transferred and the rotatory section where the direction of movement of the endless chains is merely changed by 90°, said both inner and outer chain wheels being arranged horizontally while suitably spaced-apart from each other at the rotatory section where the conveyance system is switched from horizontal conveyance to vertical conveyance while maintaining the horizontal posture of the containers and the rotatory section where vertical conveyance is changed to horizontal conveyance, and a bulk discharge promoting device provided at the rotatory section where the bulk is transferred.

In order to ensure smooth, quiet and positive movement of said series of conveyance containers while carried by the endless chains, it is desirable that the inner and outer endless chains are passed round the respective chain wheels with a half-pitch offset from each other.

In this connection it is to be added that the both inner and outer endless chains may be arranged parallel to each other without any pitch offset, which are passed round the respective chain wheels.

As said above, the inner and outer chain wheels are spaced-apart horizontally from each other at the rotatory section where the horizontal conveyance of the containers is shifted to vertical conveyance while maintaining the horizontal posture of the containers and at the rotatory section where vertical conveyance is shifted to horizontal conveyance, and in this case, the distance between the horizontally spaced-apart inner and outer chain wheels is so set that it is equal to the distance between a protuberance pivotally secured to the front end of the container and another protuberance secured fixedly to the rear end of the container.

In order to prevent the loose bulk from dropping out of the containers during supply of the bulk into the containers or during movement of the containers, it is preferred that the flexible engaging plates are mounted to the front or rear end or to both ends of each said container.

For allowing positive transfer of bulk cargo in the containers at the bulk transfer section, it is desirable that a bulk discharge promoting device composed of a spindle-shaped roller is mounted on the shaft of said section and that a means for giving vibrations to the container body is also provided in said discharge promoting device.

Other objects and advantageous features of this invention will become apparent from the following detailed description of the invention and the appended claims.

BRIEF DESCRIPTION OF DRAWINGS

The characteristic features and other peculiarities of this invention will be easily understood from the following description of the invention when taken in conjunction with the accompanying drawings in which like reference numerals are used throughout to designate like parts.

FIG. 2 is a top plan view of the conveyance system shown in FIG. 1;

FIGS. 3a, 3b, 3c and 3d are front views respectively showing the structural arrangements of the rotatory sections A, B, C and D, with the endless chains being removed;

FIG. 7 is a plane view showing connection of the container with the inner and outer endless chains;

FIG. 8 is a side view showing the assembly of a series of containers and endless chains shown in FIG. 7;

FIG. 11 is a side view showing the mechanism at and around the rotatory section D.

DETAILED DESCRIPTION OF INVENTION

Figure 1:
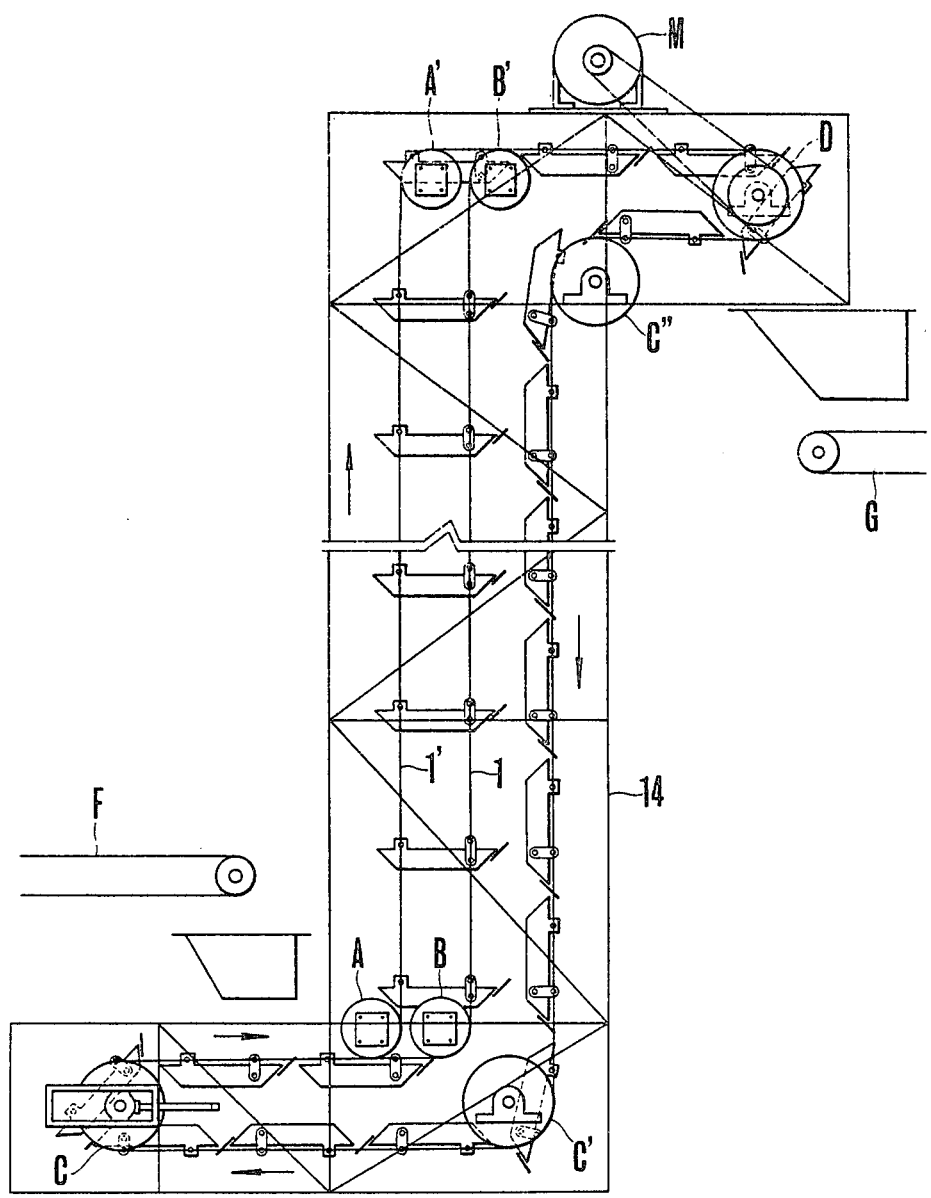
FIG. 1 is a side elevational view illustrating conceptionally the structural mechanism of the continuous conveyance system according to this invention.
Figure 4:
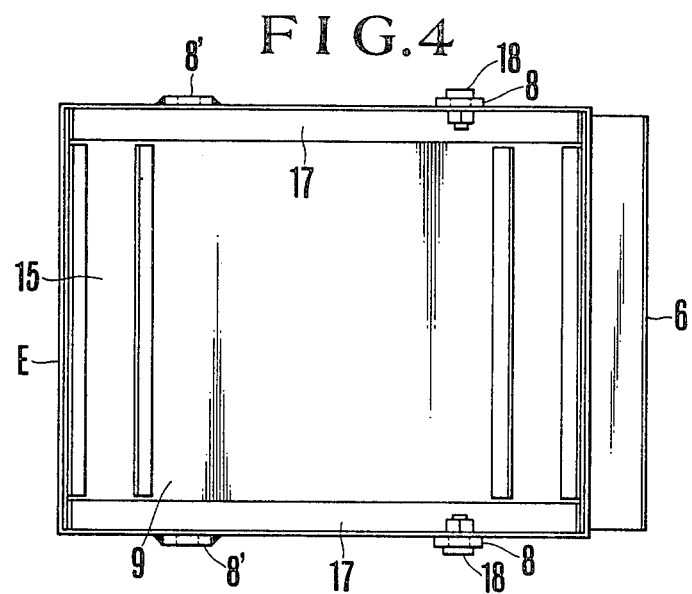
FIG. 4 is a plane view of a conveyance container used in the system of this invention.
Figure 5:
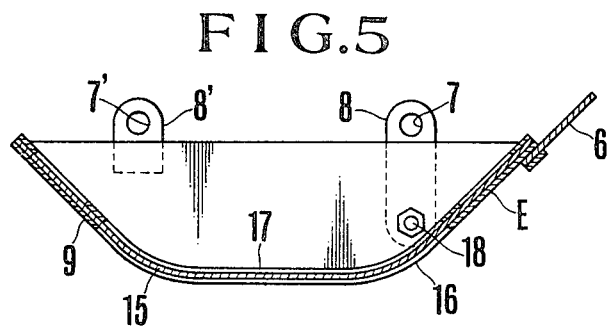
FIG. 5 is a sectional view of the container of FIG. 4 taken on a plane along the length thereof.

FIG. 1 is a side elevational view diagrammatically illustrating the conveyance mechanism of the continuous conveyance system according to this invention, and FIG. 2 is a plane view thereof. The rotatory section C positioned beneath a belt conveyor F is composed of a shaft 4 and a pair of inner chain wheels 2, 2 and a pair of outer chain wheels 2', 2' mounted toward both ends of said shaft 4 as shown in FIG. 3, and both ends of said shaft 4 are supported by bearings 3, 3 secured to the casing 14.

Figure 10:
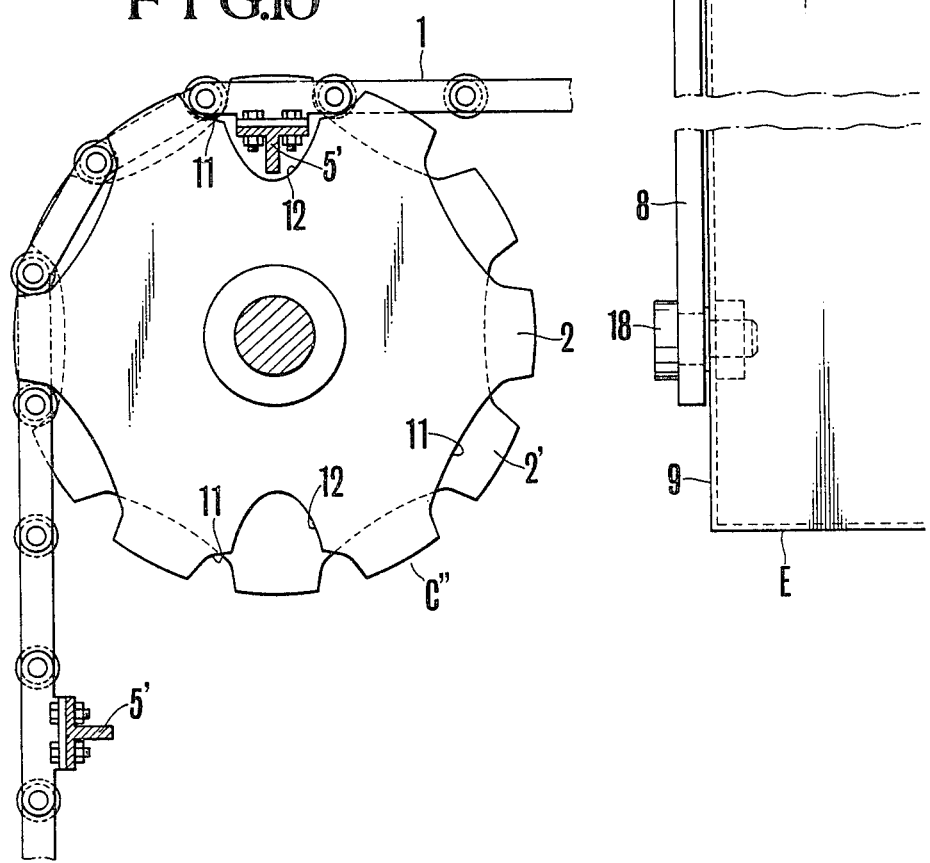
FIG. 10 is an enlarged side view showing the chain wheel and its associated elements at the rotatory section "C"

The rotatory section C' is of the same mechanism as the section C. The rotatory section C'' is also same in mechanism as the section C, but in this section C'', as shown in FIG. 10, cutouts 12 are provided suitably between the teeth of the inner chain wheel so that the connecting element 5' connecting the outer endless chain 1' and the conveyance container E (as further described later) will not interfere with the teeth of the inner chain wheel when said element 5' passes said section C''.

The rotatory section D is also substantially same in structural mechanism as the section C, but in this section, a driving chain wheel 2'' is secured to one end of the shaft 4 and connected to a motor M through reduction gearing (not shown). Also, a cargo discharge promoting device 13 is secured to the central part of said shaft 4, said device being arranged to abut against the bottom of the container E to give impact force thereto or to push up the bottom of the container to discharge out the material (bulk) therein.

The rotatory section A consists of a pair of shafts 4', 4' and a pair of outer chain wheels 2', 2' mounted on said respective shafts 4', 4' which are supported at their ends by the respective bearings 3, 3. The rotatory section B also comprises a pair of shafts 4'', 4'' on which the inner chain wheels 2, 2 are mounted, respectively, said shafts being supported at their ends by the respective bearings 3, 3. The rotatory section A' is of the same mechanism as the section A, and the rotatory section B' has the same mechanism as the section B. It will be easily understood from the accompanying drawings that the distance between the sections A and B and between the section A' and B' is equal to the distance between the shafts 10 and 10' passed horizontally across the container E.

In the conveyance system according to this invention, said rotatory sections C, A, B, A', B', D, C'' and C' are disposed at the predetermined positions shown in FIG. 1, and the inner endless chains 1 are passed round said sections C, B, B', D, C'' and C' while the outer endless chains 1' are passed round the sections C, A, A', D, C'' and C'. Also, both sides of the front end of each conveyance container E are joined to two lines of inner endless chains 1, 1 through the connecting elements 5, while both sides of the rear end of the container are joined to two lines of outer endless chains 1', 1' through the connecting elements 5', thereby arranging a plurality of containers like a train between the parallel lines of endless chains. Because of the above-described arrangement of the respective rotatory sections with the endless chains passed therearound, the conveyance containers E arranged in train are allowed to move horizontally at each horizontal transport section and to rise up vertically while equidistantly spaced-apart from each other and maintaining a normal horizontal posture at each vertical transport section.

In the rotatory section C'', each container E passes in a turned-over condition as so is the connecting element 5' which connects said container E to the outer endless chains 1'. In this case, therefore, there is a possibility that said connecting element 5' might interfere with the chain wheel 2 between the teeth thereof. In order to avoid such interference, cutouts 12 are suitably provided between the teeth of each chain wheel 2.

Also, in order to ensure smooth and secure movement of the endless chains, the inner and outer chain wheels are arranged such that their corresponding teeth are shifted by a half-pitch from each other at each rotatory section, and hence the inner and outer chain wheels are engaged alternately with the endless chains.

It is to be noted, however, that the both inner and outer chain wheels may be arranged parallel to each other without any pitch offset therebetween.

FIGS. 4 to 9 diagrammatically illustrate the connection of the conveyance container E with the inner and outer endless chain 1, 1'. The container E comprises a flexible rubber-made intermediate plate 15 extending between both side walls, with both edges of said plate being securely held by the bent portions 16, 16 at the lower ends of both side walls and presser plates 17, 17, so that the body portion 9 of the container E is ship-shaped. At the upper parts of both side wall portions of the container E are provided the front protuberances 8 which are pivotally secured by bolts 18. The rear protuberances 8' are fixed by welding to the container side walls. In the drawings numerals 7, 7' indicate bolt holes formed in the respective protuberances 8, 8', and 6 is a rubber-made engaging member secured to the front portion of the container body 9 by adhesive, bolting or other means. This engaging member 6 has the role of filling up the space produced between this container and the adjoining one.

It will be noted that the front portion of the container E is connected to the inner endless chains 1 by means of the shaft 10 passed through said round holes 7 and connecting elements 5, while the rear portion is connected to the outer endless chains 1' by means of the shaft 10' passed through said round holes 7' and connecting members 5'.

Now, the operation of the conveyance system according to this invention is described with particular reference to FIG. 1. When the motor is started to let the inner and outer endless chains 1, 1' move in the direction of arrows, the containers E arranged in train move horizontally in the direction of arrow at the lower horizontal transport section. At the vertical transport section, since the inner endless chains 1 are passed round the inner chain wheels 2 at the rotatory sections B, B' and the outer endless chains 1' are passed round the outer chain wheels 2' at the rotatory sections A, A', the containers E rise up vertically while spaced-apart from each other vertically and maintaining the horizontal posture, and upon reaching the top of the ascending line, each container E is turned 90° at tne rotatory sections A', B' and move forward horizontally in the direction of arrow. Then each container E is inverted at the rotatory section D to move horizontally in an inverted state and is further turned 90° at the rotatory section C" to move downwardly in a posture shown in the drawing, and upon reaching the rotatory section C', each container is further turned 90° to move toward the rotatory section C.

Thus, according to the system of this invention, the bulk such as powder is continuously dropped from a belt conveyor F into each conveyance container E which has just reached the lower horizontal transport section, and during this operation, no drop-out of bulk is caused owing to the engaging member 6 provided to each container E to fill up the space between the adjoining containers. Each container E which has thus been loaded with bulk moves on horizontally, then rises up vertically along the ascending line at the vertical transport section and then changes into horizontal movement at the upper horizontal transport section. When the container E is inverted at the rotatory section D, the bulk in the container is perfectly discharged out, with no leftover in the container, by the action of the discharge promoting device and is successively dropped onto a belt conveyor G disposed below the rotatory section D.

It is to be added that the container E can maintain the horizontal posture during passing through the said lower rotatory sections A, B as well as the said upper rotatory sections A', B' owing to the fact that the inner and outer chains 1, 1' are arranged at a distance therebetween, which corresponds to that between the front and rear protuberances 8 and 8' or the front and rear connecting members 5 and 5'.

Further it is to be added that the container E can pass smoothly through all the rotatory sections C, C', C" and D, because the protuberances 8 are pivotally moved so as to correct the reduced distance between the connecting members 5 and 5', the said reduced distance being caused during the passage through the rotatory sections.

The body of the container used in the transport system of this invention is preferably constituted from rubber plates, laminate plates formed by bonding a thin flexible metal plate to the underside of each rubber plate, plates made of an elastic synthetic resin with excellent releasability, or elastic plates provided with a releasing layer on the surface. Use of such container plates allows absorption of any metallic sound produced during operation of the system. Also, owing to water repellency of said container plates, even moist bulk can be perfectly discharged out of the container without causing adhesion of bulk to the container walls. Further, bulk is urged to gather centrally in the ship-shaped container, without adhering to the container walls, during movement of the container, and when the container is inverted at the rotatory section D, bulk is perfectly discharged out without adhering to the container bottom under the action of the discharge promoting device.

Figure 6:
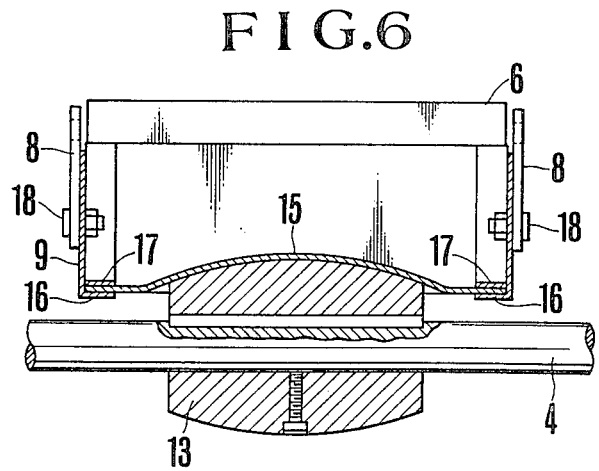
FIG. 6 is a cross-sectional view of the container of FIG. 4, showing a condition where the bottom portion of the container is raised up by the bulk cargo discharge promoting device.
Figure 9:
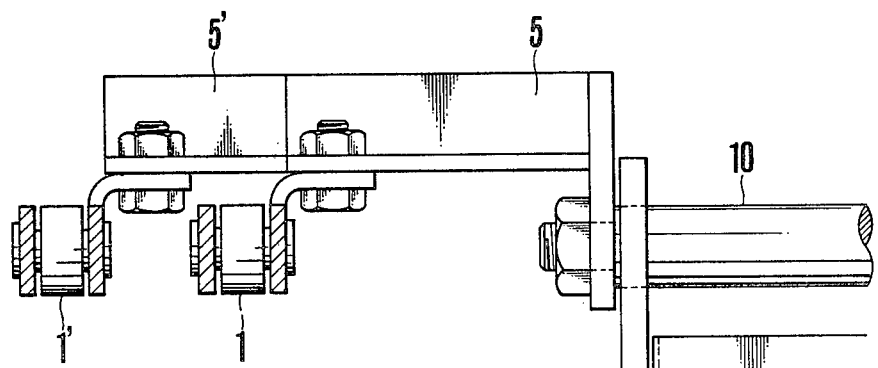
FIG. 9 is a front view showing the mode of connection between container and endless chain on an enlarged scale.

The discharge promoting device, as best shown in FIG. 6, comprises a spindle-shaped roller mounted on a shaft. In order to better the discharging action, it is recommended to provide unevenness on the surface 13' to produce a sort of vibration.

FIGS. 6 and 11 show the deformed condition of the container plate at the inversion section.

Other features of the continuous bulk transport system according to this invention are as follows:

(1) A great volume of bulk can be transported not only vertically but also at any inclination.

(2) At the horizontal transport section, no drop-out of bulk such as powder is caused because an engaging member made of a rubber plate or such is provided to each transport container such that said engaging member with engage or overlap with that of the adjoining container or directly with the adjoining container, and hence high transport efficiency is ensured.

(3) The installation area required for the system of this invention is far smaller than that required for the conventional belt conveyor owing to the fact conveyance can be effected in the vertical direction.

(4) It is possible to transport bulk from an elevated location to a lower place by performing the reverse operation.

Having the above-described features and effect, the transport system according to this invention can be applied for a variety of uses, such as for stowing and unstowing the ship's hold with bulk, conveyance of sand in undergound construction work, conveyance of ores in mines, etc.

The foregoing description of the invention and the accompanying drawings are merely intended to be illustrative, and not limiting, and it will be obvious that various changes and modifications can be made in the abovedescribed embodiments without departing from the scope of the present invention, that scope only being limited by the scope of the appended claims.

What is claimed is:

1. A continuous conveyance system comprising in combination:
    a plurality of conveyance containers of the kind which retain their shape in the absence of substantial external stresses, for conveying loose bulk, each conveyance container having a front and a rear portion, including opposing side walls having upper edges;

two pairs of endless spaced-apart chains respectively joined to the front and rear portions of each of said plurality of containers at said opposing side walls, said two pairs of endless chains comprising a first pair of endless chains for carrying the front portion of each said container and a second pair of endless chains for carrying the rear portion of each said container;

sprocket means for directing said two pairs of endless chains along a continuous path, said path including a plurality of successive segments, each segment having respective corresponding first and second ends whereby said endless chains are directed from said corresponding first ends to said corresponding second ends, said plurality of segments including a first lower horizontal segment in which said endless chains are directed in a first horizontal direction, a first inclined segment in which said endless chains are directed in an upward direction and a second horizontal segment in which said two pairs of endless chains are directed in said first horizontal direction, the first end of said first inclined segment being disposed at the second end of said first horizontal segment, and the second end of said first inclined segment being disposed at the first end of said second horizontal segment, and a fourth segment in which said two pairs of endless chains are directed between said third segment second end and said first segment first end;

said sprocket means including a first plurality of sprockets disposed at said first inclined segment first end, a second plurality of sprockets disposed at said first inclined segment second end, a third plurality of sprockets disposed at said first horizontal segment first end, and a fourth plurality of sprockets disposed at said second horizontal segments second end, for directing said first and second pairs of endless chains in a first horizontal plane in said first horizontal segment and in a second horizontal plane in said second horizontal segment, and for directing said first pair of endless chains into a first inclined plane and directing said second pair of endless chains in a second inclined plane parallel said first inclined plane in said first inclined segment;

means for joining each of said conveyance containers to said first and second pairs of endless chains, said joining means including for each of said containers:

a pair of front protuberant elements having first and second front element ends, first means for respectively securing said pair of front protuberant elements at said first front element ends to said opposite sides of said front portion and first means for securing said second front element ends, to respective chains of said first pair of chains;

and a pair of rear protuberant elements having first and second rear element ends, second means for respectively securing said pair of rear protuberant elements at said first rear element ends to said opposing sides at said rear portion of said container, second means for fixing said second rear element ends to respective chains of said second pair of chains;

said front and rear protuberant elements extending beyond said opposing side wall upper edges;

at least one of said first and second securing means comprising means for pivotally securing one of said pairs of protuberant elements to said opposing side walls;

said endless chains continuously carrying said plurality of containers in an upright state from said first horizontal segment first end to said second horizontal segment second end.

2. A conveyance system as in claim 1 wherein said first and second fixing means comprise front and rear shafts respectively passing through said front and rear second element ends, front connection elements respectively joined to opposite ends of said front shaft and to respective chains of said first pair of chains, and rear connection elements respectively joined to opposite ends of said rear shaft and to respective chains of second pair of chains.

3. A conveyance system as in claim 1 wherein each said container includes a resilient and flexible base; said walls being resilient; said fourth plurality of sprockets including four sprockets respectively aligned for rotation about a common axis and for engaging a corresponding endless chain of said two pairs of endless chains, said sprocket means further comprising a first sprocket shaft joining said four sprockets along said common axis, said first sprocket shaft including means for slidably engaging and pressurizing said resilient base to deform said base to promote discharge of said bulk from said containers as said containers are drawn around said first sprocket shaft.

4. A conveyance system as in claim 1 or claim 3 wherein said slidably engaging and pressurizing means comprises a spindle shaped roller; the diameter of said spindle-shaped roller being largest at its middle portion and reduced toward its end portions adjacent said four sprockets.

5. A conveyance system as in claim 4 wherein said roller has an uneven outer surface in order to induce vibrations in said containers which further promote discharge of said bulk as said containers are drawn around said first sprocket shaft.

6. A continuous conveyance system comprising in combination:

a plurality of conveyance containers of the kind which retain their shape in the absence of substantial external stresses, for conveying loose bulk, each conveyance container having a front and a rear portion including opposing side walls having upper edges;

two pairs of endless spaced-apart chains respectively joined to the front and rear portions of each of said plurality of containers at said opposing sides, said two pairs of endless chains comprising a first pair of endless chains for carrying the front portion of each said container and a second pair of endless chains for carrying the rear portion of each said container;

sprocket means for directing said two pairs of endless chains along a continuous path, said path including a plurality of successive segments, each segment having respective corresponding first and second ends whereby said endless chains are directed from said corresponding first ends to corresponding second ends, said plurality of segments including a first lower horizontal segment in which said endless chains are directed in a first horizontal direction, a first inclined segment in which said endless chains are directed in an upward direction and a second horizontal segment in which said two pairs of endless chains are directed in said first horizontal direction, the first end of said first inclined segment being disposed at the second end of said first horizontal segment, and the second end of said first inclined segment being disposed at the first end of said second horizontal segment, and a fourth segment in which said two pairs of endless chains are directed between said third segment second end and said first segment first end;

said sprocket means including a first plurality of sprockets disposed at said first inclined segment first end, a second plurality of sprockets disposed at said first inclined segment second end, a third plurality of sprockets disposed at said first horizontal segment first end, and a fourth plurality of sprockets disposed at said second horizontal segment second end, for directing said first and second pairs of endless chains in a first horizontal plane in said first horizontal segment and in a second horizontal plane in said second horizontal segment, and for directing said first pair of endless chains into a first inclined plane and directing said second pair of endless chains in a second inclined plane parallel said first inclined plane in said first inclined segment;

means for joining each of said conveyance containers to said first and second pairs of endless chains, said joining means including for each of said containers:

two front protuberant elements having first and second front element ends, respectively pivotally secured at said first front element ends to said opposing sides at said front portion, a first shaft passing through said two front protuberant elements at said second front element ends, and front connecting members joined to opposite ends of said front shaft and respective chains of said first pair of chains;

and two rear protuberant elements having first and second rear element ends respectively fixedly secured at said first ends to said opposing sides at said rear portion of said container, a second shaft passing through said two rear protuberant elements at said second rear element ends and rear connecting elements joined to opposite ends of said rear shaft and respective chains of said second pair of chains;

said front and rear protuberant elements extending beyond said opposing side wall upper edges;

said endless chains continuously carrying said plurality of containers in an upright state from said first horizontal segment first end to said second horizontal segment second end.

7. A conveyance system as in claim 2 or claim 6 wherein said containers are turned upside-down and reversed in direction by said fourth plurality of sprockets at said second end of said second horizontal segment wherein said fourth segment includes a first horizontal subsegment having a first end extending from just beneath said second horizontal segment second end to a second end in which first horizontal subsegment said endless chains are directed in a second horizontal direction opposite said first horizontal direction and a first inclined subsegment extending from said first horizontal subsegment second end to a first inclined subsegment second end, in which first inclined subsegment said endless chains are directed in a downward direction, said sprocket means further comprising a fifth plurality of sprockets disposed at said first horizontal subsegment second end, each of said sprockets having plurality of teeth for engaging said endless chains and turning the direction of said endless chains from said second horizontal direction into said downward direction, said fifth plurality of sprockets having cutout portions between said teeth for receiving said connecting members when said containers are turned thereabout so as not to interfere with the engagement of said fifth plurality of sprockets with said endless chains.

8. A continuous conveyance system comprising in combination:

a plurality of conveyance containers for conveying loose bulk, each conveyance container having a front and a rear portion and having a base, two side opposing walls having upper edges and front and rear walls, at least said base being flexible and resilient;

two pairs of endless spaced-apart chains respectively joined to the front and rear portions of each of said plurality of containers at said opposing sides, said two pairs of endless chains comprising a first pair of endless chains for carrying the front portion of each of said plurality of containers and a second pair of endless chains for carrying the rear portion of each of said plurality of containers;

sprocket means for directing said two pairs of endless chains along a continuous path, said path including a plurality of successive segments, each segment having respective corresponding first and second ends whereby said endless chains are directed from said corresponding first ends to said corresponding second ends, said plurality of segments including a first lower horizontal segment in which said endless chains are directed in a first horizontal direction, a first inclined segment in which said endless chains are directed in an upward direction and a second horizontal segment in which said two pairs of endless chains are directed in said first horizontal direction, the first end of said first inclined segment being disposed at the second end of said first horizontal segment, and the second end of said first inclined segment being disposed at the first end of said second horizontal segment, and a fourth segment in which said two pairs of endless chains are directed between said third segment second end and said first segment first end;

said sprocket means including a first plurality of sprockets disposed at said first inclined segment first end, a second plurality of sprockets disposed at said first inclined segment second end, a third plurality of sprockets disposed at said first horizontal segment first end, and a fourth plurality of sprockets disposed at said second horizontal segment second end, for directing said first and second pairs of endless chains in a first horizontal plane in said first horizontal segment in a second horizontal plane in said second horizontal segment, and for directing said first pair of endless chains into a first inclined plane and directing said second pair of endless chains in a second inclined plane parallel said first inclined plane in said first inclined segment;

wherein said fourth plurality of sprockets includes four sprockets respectively aligned for rotation about a common axis and for engaging a corresponding endless chain of said two pairs of endless chains, said sprocket means further comprising a first sprocket shaft joining said four sprockets of said fourth plurality of sprockets along said common axis, said first sprocket shaft including means, fixedly mounted to and rotatable with said first sprocket shaft, for slidably engaging and pressurizing said resilient base of each of said containers to deform said base so as to promote discharge of said bulk from said containers as said containers are drawn around said first sprocket shaft; and means for joining each of said conveyance containers to said first and second pairs of endless chains respectively at said front and rear portions of said containers.

9. A conveyance system as in claim 1 or claim 8 wherein said container front and rear walls respectively extend upward and outward from said base between said side walls, said base being elongated from said front wall to said rear wall.

10. A conveyance system set forth in claim 1 or claim 8, wherein a flexible engaging plate is provided to at least one of the front end and rear ends of each conveyance container for preventing the spillage of said loose bulk between successive conveyance containers when said loose bulk is dropped into said containers.

* * * * *